UNITED STATES PATENT OFFICE.

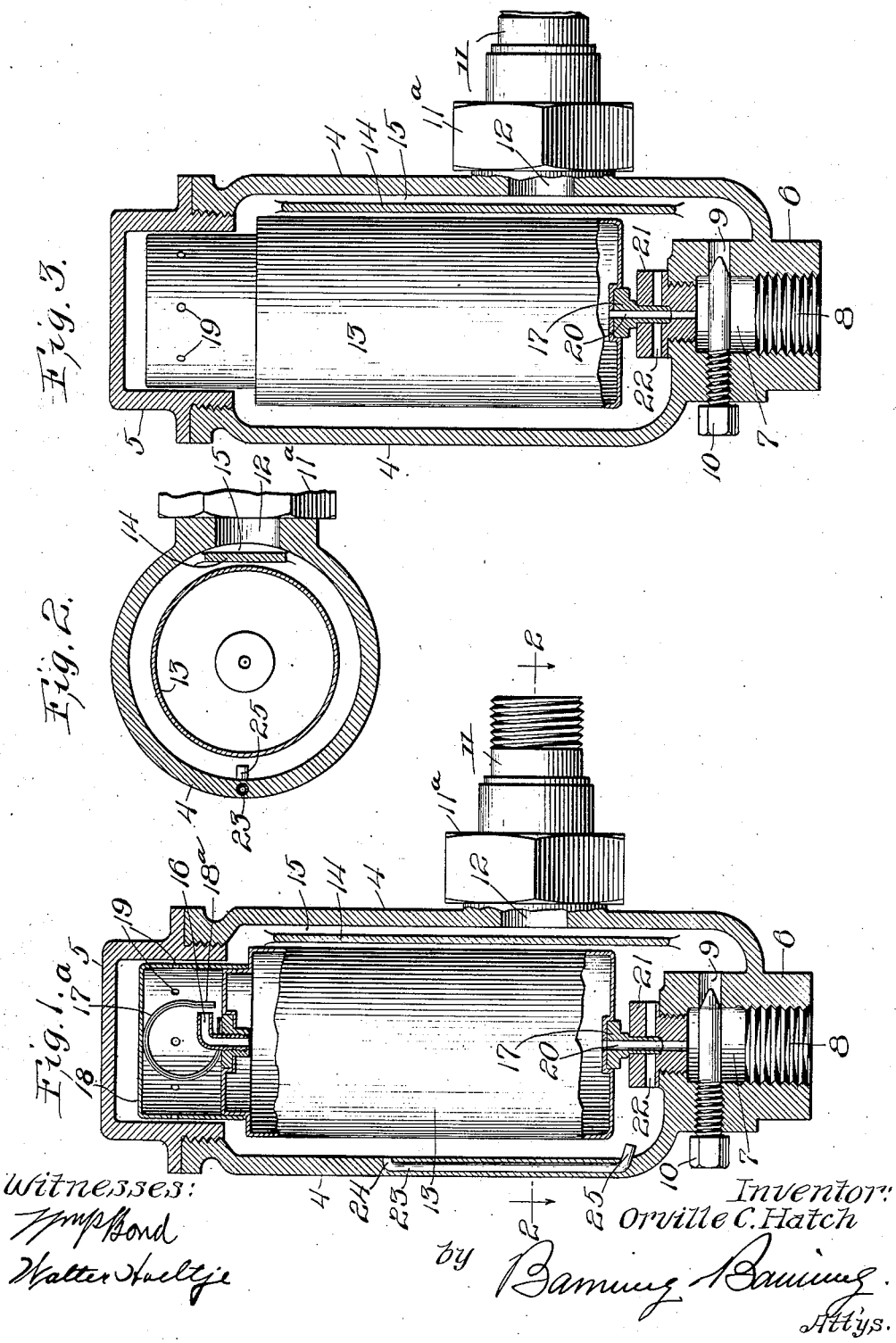

ORVILLE CROMWELL HATCH, OF SEATTLE, WASHINGTON.

VALVE FOR STEAM-HEATING SYSTEMS.

1,114,609.  Specification of Letters Patent.  Patented Oct. 20, 1914.

Application filed June 14, 1912. Serial No. 703,705.

*To all whom it may concern:*

Be it known that I, ORVILLE CROMWELL HATCH, a citizen of the United States, residing at Seattle, in the county of King and State of Washington, have invented certain new and useful Improvements in Valves for Steam-Heating Systems, of which the following is a specification.

The valve of the present invention is more particularly designed and adapted for use in controlling the eduction of air and water of condensation from the body of the radiator and preventing the undue escapement of steam, and is what is commonly termed in the trade a "radifier" valve.

The objects of the present invention are, to arrange a shield-like member between the inlet from the radiator to the interior of the casing and the float, whereby the water of condensation entering the float chamber will not directly impinge or strike the float; to arrange an unrestricted communication with the float chamber at both the upper and lower ends of this shield-like member; to provide a thermostatic member for controlling the passage of air out of the interior of the casing and to inclose this thermostatic member in a suitable housing or casing; and to arrange a pipe or tubular passage leading from a point at approximately the line of flotation of the float to the lower end of the float chamber for the purpose of conducting oil or flotage which may accumulate on the top of the body of water within the float chamber to the lower portion of the float chamber, where it will be drawn off through the discharge passage.

The invention further consists in the features of construction and in the combination of parts hereinafter described and claimed.

In the drawings, Figure 1 is a longitudinal section of the valve of the present invention; Fig. 2, a section on line 2—2 of Fig. 1, looking in the direction of the arrow; and Fig. 3, a view, partly in section, showing a form of construction in which the pipe for conducting the oil and flotage is eliminated.

The valve of the present invention is inclosed within a casing 4 of suitable size and configuration, the interior of the casing forming a float chamber as is usual in devices of this nature; and the upper end of the casing is closed by means of an ordinary cap or closure 5. The lower end of the casing is formed with a nipple or boss 6, having an opening 7 therein, which constitutes a discharge passage leading from the interior of the casing, through which the water of condensation is drawn off. The walls of the opening 7 are provided with a screw-thread 8, to which is attached the ordinary discharge pipe of the system. A by-pass 9 is formed in the nipple 6, which is controlled by a valve member 10, said by-pass serving to permit the withdrawal of any sediment which may accumulate in the extreme lower part of the float chamber, whereby the valve can be readily and quickly cleaned. A nipple or connection 11 is provided, which is adapted to be attached, by a suitable coupling nut 11$^a$, to the casing of the valve; and this nipple is provided with a passage 12, which constitutes an inlet passage to the interior of the casing 4. A float 13, of suitable size and configuration, is located within the casing 4; and interposed between this float and the inlet passage 12 is a wall or shield 14, which, in the form illustrated in the drawings, consists of a web-like member (clearly shown in Fig. 2) cast with the walls of the casing. The web-like member is spaced away from the walls of the casing for the major portion of its width to provide a passage 15 for water of condensation.

It will be seen from a study of Fig. 1 that the openings at the upper and lower ends of this wall, which permit the entrance of water of condensation into the float chamber, are entirely unrestricted; that is, there is a perfectly free passage for water and air from the inlet 12 to the float chamber. By this arrangement, the water of condensation coming into the interior of the casing is prevented from direct impingement against the float, which is undesirable, because of the fact that it tends to wabble and disturb the regular movements of the float. Also, the unrestricted communication with the float chamber which is provided by this arrangement allows any agitation from a slug of water, or water hammer, to pass in both directions into the float chamber; that is, to the top of the float and to the bottom of the float, so that no disturbance of the float is created by an undue passage or discharge of air or water into the float chamber. It will be readily understood that, if the passage to the float chamber is restricted either at the top or bottom, or both, any happening or occurrence which would create a greater than normal passage of air or water into the float chamber would cause the float to vibrate or shake, giving to the same an abnormal and undesirable movement.

The float 13 is provided with an upper tubular member 16 and a lower tubular member 17. The upper tubular member, in the form shown, is in the shape of a bent tube and constitutes what may be termed the air induction member, since it is through this member that the air from the float chamber passes into the hollow interior of the float 13. In order to control the passage through this induction member, so that, after the air has been exhausted from the radiator, steam will not be allowed to pass out through the escapement means provided for the air, a thermostatic member 17$^a$ is provided which, in the form shown, consists of a bourdon spring having its free end 18$^a$ arranged to close the open end of the air induction member when said thermostatic member is subjected to the influence of heat. By this arrangement, when the steam first enters the radiator the air discharged therefrom will have a free entrance into the interior of the float 13, but after the air has been exhausted and steam begins to enter the float chamber the heat of the steam will bend the thermostatic member 17$^a$, so that the free end of it will cover the open end of the air induction member and cut off communication between the interior of the float and the float chamber.

A housing 18 is provided for the thermostatic member, which is in the shape of a cap or cover affixed to the upper end of the float and provided with a series of openings 19 to permit the entrance of air and steam thereinto. Attached to the lower end of the float, as previously stated, is a tubular member 17, which constitutes a valve for controlling the flow of water of condensation through the discharge passage. This member 17 is provided with a passage 20, whereby air conducted into the hollow float will be educted therefrom through this passage and into the discharge passage of the system. The valve member 17 seats, as shown, within a plug 21 screw-threaded into the nipple or boss 6, and this plug is provided with a series of openings or passages 22, which communicate with the discharge passage.

In the operation of valves of this character, it frequently happens that a mass of oil and flotage will collect upon the top of the water of condensation, and this oil or flotage if allowed to remain too long will accumulate in such quantities as to interfere with the movements of the float. To provide for the eduction of this oil and flotage from the float chamber, I have illustrated a means, which consists of a tubular passage 23 formed in the wall of the casing, which passage has one open end 24 in communication with the float chamber at a point approximately the line of flotation of the float, and has its other end 25 in communication with the float chamber at the lower end of said chamber. By this arrangement, the oil or flotage on top of the water of condensation within the float chamber will be educted through this tubular passage 23 and brought to the lower part of the float chamber, where it will be carried off through the discharge passage. It is understood that this tubular passage is of a relatively restricted nature and is only designed and adapted to take care of the oil and flotage, and is not designed nor intended to carry off any appreciable portion of the water of condensation, this water of condensation passing out directly through the passages 22 in the plug 21 and into the discharge passage 7.

The operation will be clearly understood from the foregoing, but briefly is as follows: When the water of condensation enters the interior of the casing through the inlet 12, it will pass around the shield or web 14 and enter the float chamber. After it has accumulated in the float chamber to a sufficient height, the float will rise, unseating the tubular valve member 17 and allowing the water of condensation to be drawn out through the passages 22 into the discharge passage 7. When steam is first admitted to the radiator, the air discharged therefrom will flow out through the passage provided by the air inlet 16, the float 13, and tubular valve member 17. The entrance of steam into the casing following the flow of air therethrough actuates the thermostatic member 17$^a$ to close the air induction opening and prevent the further discharge of air. As the water rises and sinks around the upper end 24 of the tubular passage 23, the oil or flotage will be conducted through said pipe to the lower portion of the float chamber when water is being educted through the passage 22 and discharged.

I claim:

1. In a valve of the class described the combination of a casing having an inlet passage and an outlet passage therein, a float within the casing arranged to permit passage of air therethrough, a tubular member arranged on the top of the float for the induction of air into the float, a hollow valve plug at the bottom of the float for controlling the outlet passage and for establishing communication between the interior of the float and the outlet passage, a thermostatic member adapted to control the outer open end of said top tubular member, and a housing for said thermostatic member carried by and movable with the float and acting in conjunction with the inner wall of the upper portion of the casing as a guiding means for the upper end of the float, substantially as described.

2. In a valve of the class described the combination of a casing having an inlet passage and an outlet passage therein, a float within the casing for governing the outlet passage, means for conducting air through the float to the outlet passage, a thermostatic member for controlling the passage of air through the float, and a housing for said thermostatic member carried by the float and acting in conjunction with the inner wall of the upper end of the casing as a guiding means for the upper end of the float, substantially as described.

3. In a valve of the class described the combination of a casing having an inlet passage and an outlet passage therein, a hollow float within the casing for governing the outlet passage, an elbow shaped tubular member at the top of the float forming the air eduction member to the interior of the float, a tubular member at the lower end of the float forming the air induction member and serving as a valve for controlling the outlet passage, a bowed thermostatic member having one end secured adjacent said elbowed tubular member and extending over the top of said tubular member to position its free end in operative relation to the open outer end of said tubular member and a housing for said thermostatic member carried by the float and serving in conjunction with the inner wall of the upper portion of the casing as a guiding means for the upper end of the float, substantially as described.

ORVILLE CROMWELL HATCH.

Witnesses:
EUGENE A. CHILD,
STELLA CAYO.